(12) United States Patent
Campolo et al.

(10) Patent No.: US 9,847,045 B2
(45) Date of Patent: Dec. 19, 2017

(54) APPARATUS FOR UPPER BODY MOVEMENT

(71) Applicant: NANYANG TECHNOLOGICAL UNIVERSITY, Singapore (SG)

(72) Inventors: Domenico Campolo, Singapore (SG); Ferdinan Widjaja, Singapore (SG); Julius Klein Hubert, Singapore (SG)

(73) Assignee: Nanyang Technological University, Singapore (SG)

( * ) Notice: Subject to any disclaimer, the term of this patent is extended or adjusted under 35 U.S.C. 154(b) by 162 days.

(21) Appl. No.: 14/650,544

(22) PCT Filed: Dec. 10, 2013

(86) PCT No.: PCT/SG2013/000520
§ 371 (c)(1),
(2) Date: Jun. 8, 2015

(87) PCT Pub. No.: WO2014/092645
PCT Pub. Date: Jun. 19, 2014

(65) Prior Publication Data
US 2015/0302777 A1    Oct. 22, 2015

Related U.S. Application Data

(60) Provisional application No. 61/735,295, filed on Dec. 10, 2012.

(51) Int. Cl.
*G09B 23/28* (2006.01)
*A61H 1/02* (2006.01)
(Continued)

(52) U.S. Cl.
CPC .......... *G09B 23/28* (2013.01); *A61H 1/0274* (2013.01); *A61H 2201/0157* (2013.01);
(Continued)

(58) Field of Classification Search
USPC ............... 434/114, 219, 234, 247, 258, 262; 340/407.1; 703/7
See application file for complete search history.

(56) References Cited

U.S. PATENT DOCUMENTS 2,785,941 A * 3/1957 Sutherland ............. F16H 19/06
                                                            33/1 M
3,505,670 A   4/1970 Cone et al.
(Continued)

FOREIGN PATENT DOCUMENTS

EP    0315310 A1    5/1989
GB    2274719    *  8/1994    ............. F16H 19/06
(Continued)

OTHER PUBLICATIONS

Foreign Communication from a Related Counterpart Application, International Search Report and Written Opinion dated Mar. 6, 2014, International Application No. PCT/SG2013/000520, filed on Dec. 10, 2013.
(Continued)

*Primary Examiner* — Kurt Fernstrom (57) ABSTRACT

There is provided an apparatus for upper body movement. The apparatus comprises a H-shaped cable-driven mechanism; two motors for driving the H-shaped cable-driven mechanism; and a manipulandum coupled to the H-shaped cable-driven mechanism for independent movement along x and y axes.

9 Claims, 6 Drawing Sheets

(51) Int. Cl.

| | | |
|---|---|---|
| A63B 21/005 | (2006.01) | |
| A63B 23/12 | (2006.01) | |
| A63B 24/00 | (2006.01) | |
| A63B 22/00 | (2006.01) | |
| A63B 71/06 | (2006.01) | |
| A63B 21/00 | (2006.01) | |

(52) U.S. Cl.
CPC ........... *A61H 2201/123* (2013.01); *A61H 2201/1215* (2013.01); *A61H 2201/1246* (2013.01); *A61H 2201/149* (2013.01); *A61H 2201/1635* (2013.01); *A61H 2201/1638* (2013.01); *A61H 2201/1666* (2013.01); *A61H 2201/5007* (2013.01); *A61H 2201/5043* (2013.01); *A61H 2201/5061* (2013.01); *A61H 2201/5064* (2013.01); *A61H 2201/5092* (2013.01); *A63B 21/0058* (2013.01); *A63B 21/00178* (2013.01); *A63B 21/00181* (2013.01); *A63B 21/4035* (2015.10); *A63B 21/4043* (2015.10); *A63B 21/4047* (2015.10); *A63B 23/12* (2013.01); *A63B 24/0087* (2013.01); *A63B 2022/0094* (2013.01); *A63B 2024/0096* (2013.01); *A63B 2071/0655* (2013.01); *A63B 2220/10* (2013.01); *A63B 2220/51* (2013.01); *A63B 2220/54* (2013.01); *A63B 2220/805* (2013.01)

(56) References Cited

U.S. PATENT DOCUMENTS

| | | | | |
|---|---|---|---|---|
| 4,315,437 | A * | 2/1982 | Etcheparre ............. | B23Q 1/621 33/1 M |
| 4,524,520 | A * | 6/1985 | Levy .................... | B23Q 5/34 33/1 M |
| 4,600,083 | A * | 7/1986 | Parent ................... | B05B 13/04 33/1 M |
| 4,922,173 | A * | 5/1990 | Lawler .................. | B25J 9/023 318/568.2 |
| 5,207,114 | A | 5/1993 | Salisbury, Jr. et al. | |
| 5,587,937 | A * | 12/1996 | Massie .................. | B25J 9/1689 700/264 |
| 5,850,928 | A * | 12/1998 | Kahlman ............... | B66C 13/22 212/285 |
| 6,046,563 | A * | 4/2000 | Moreyra ............... | B25J 9/1689 318/560 |
| 6,070,480 | A * | 6/2000 | Kerschner ............. | B23Q 1/621 74/89.2 |
| 6,088,020 | A * | 7/2000 | Mor ....................... | G06F 3/016 318/628 |
| 6,886,812 | B2 | 5/2005 | Kazerooni | |
| 7,043,337 | B2 * | 5/2006 | Colgate ................. | B66D 3/18 212/270 |
| 7,831,292 | B2 * | 11/2010 | Quaid .................... | A61B 34/20 345/156 |
| 8,042,425 | B2 * | 10/2011 | Dujardin ............... | B25J 9/026 74/490.09 |
| 8,317,453 | B2 * | 11/2012 | Givens .................. | B25J 5/04 248/325 |
| 8,547,328 | B2 * | 10/2013 | Berkley ................. | G06F 3/016 345/156 |
| 8,950,734 | B2 * | 2/2015 | Ogawa .................. | B66C 13/44 254/267 |
| 9,108,360 | B2 * | 8/2015 | Comb .................... | F16H 19/06 |
| 9,233,046 | B2 * | 1/2016 | Matjacic ............... | A61H 1/0274 |
| 2007/0112458 | A1 | 5/2007 | Kondo et al. | |
| 2010/0016766 | A1 | 1/2010 | Zhang et al. | |
| 2012/0330198 | A1 | 12/2012 | Patoglu | |

FOREIGN PATENT DOCUMENTS

| | | |
|---|---|---|
| GB | 2274719 A | 8/1994 |
| WO | 2012114274 A2 | 8/2012 |
| WO | 2014092645 A1 | 6/2014 |

OTHER PUBLICATIONS

Brewer BR, McDowell SK, Worthen-Chaudhari LC (2007) Poststroke Upper Extremity Rehabilitation: A Review of Robotic Systems and Clinical Results. Topics in Stroke Rehabilitation 14(6):22-44.

Campolo D, Accoto D, Formica D, Guglielmelli E (2009) Intrinsic Constraints of Neural Origin: Assessment and Application to Rehabilitation Robotics. IEEE Trans. on Robotics (Special Issue on 'Rehabilitation Robotics') 25 (3):492-501.

Casadio M, Giannoni P, Morasso P, Sanguineti V (2009) A proof of concept study for the integration of robot therapy with physiotherapy in the treatment of stroke patients. Clin Rehabil 23: 217-228.

Colombo R, Pisano F, Micera S, Mazzone A, Delconte C, Carrozza MC, Dario P, Minuco G (2008) Assessing Mechanisms of Recovery During Robot-Aided Neurorehabilitation of the Upper Limb, Neurorehab. and Neural Repair, 22:50-63.

L Dipietro, H. I. Krebs, S. E Fasoli, B. T. Volpe, J. Stein, C. Bever and N. Hogan (2007) Changing Motor Synergies in Chronic Stroke. Neurophysiol 98:757-768.

C.G. Burgar, P.S. Lum, P.C. Shor, M. Van der Loos (2000) Development of robots for rehabilitation therapy: the Palo Alto VA/Stanford experience. J Rehabilitation Research and Development 37:663-73.

S Hesse, C Werner, M Pohl, J Mehrholz, U Puzich, and HI Krebs (2008) Mechanical arm trainer for the treatment of the severely affected arm after a stroke: a single-blinded randomized trial in two centers Am J Phys Med Rehab 87 (10):779-88.

LE Kahn, ML Zygman, WZ Rymer, DJ Reinkensmeyer (2006) Robot-assisted reaching exercise promotes arm movement recovery in chronic hemiparetic stroke: a randomized controlled pilot study, J Neuroeng Rehabil, 3(12).

HI Krebs et al (2003) Rehabilitation Robotics: Performance-Based Progressive Robot-Assisted Therapy, Autonomous Robots 15, 7-20.

Kwakkel G, Kollen B (2007) Predicting improvement in the upper paretic limb after stroke: A longitudinal prospective study. Restorative Neurology and Neuroscience 25:453-460.

Langhorne P, Widen-Holmqvist L (2007), Early supported discharge after stroke, Journal of Rehabilitation Medicine, 39:103-108.

Lo et al. (2010) Robot-assisted therapy for long-term upper-limb impairment after stroke, New Engl J Med 362 (19):1772-83.

P. Lum, D.J. Reinkensmeyer, R. Mahoney, W.Z. Rymer, C. Burgar (2002) Robotic devices for movement therapy after stroke: current status and challenges to clinical acceptance. Top Stroke Rehabilitation 8:40-53.

Lu EC, Wang RH, Hebert D, Boger J, Galea MP, Mihilidis A (2011) The development of an upper limb stroke rehabilitation robot: identification of clinical practices and design requirements through a survey of therapists. Disability and Rehabilitation: Assistive Technology, 6(5): 420-431.

Lu EC, Wang RH, Huq R, Gardner D, Karam P, Zabjek K, Hebert D, Boger J, Mihilidis A (2011) Development of a robotic device for upper limb stroke rehabilitation: a user-centered design approach, PALADYN Journal of Behavioral Robotics 2(4):176-184.

S. Micera, M.C. Carrozza, E. Guglielmelli, G. Cappiello, F. Zaccone, C. Freschi, R. Colombo, A. Mazzone, C. Delconte, F. Pisano, G. Minuco, P. Dario (2005) A Simple Robotic System for Neurorehabilitation. Autonomous Robots19:271-284.

P. Morasso (1981) Spatial control of arm movements. Exp Brain Res 42:223-227.

D.J. Reinkensmeyer, L.E. Kahn, M. Averbuch, A. McKenna-Cole, B.D. Schmit, W.Z. Rymer (2000) Understanding and treating arm movement impairment after chronic brain injury: progress with the ARM guide, Journal of Rehabilitation Research and Development 37:653-662.

(56) References Cited

OTHER PUBLICATIONS

Sanguineti, V., Morasso, P., Baratto, L., Brichetto, G., Mancardi, G. L., & Solaro, C. (2003). Cerebellar ataxia: Quantitative assessment and cybernetic interpretation. Human Movement Science, 22, 189-205.

T Schallert, JL Leasure, B Kolb (2000) Experience-associated structural events, subependymal cellular proliferative activity, and functional recovery after injury to the central nervous system, J Cerebr Blood F Met, 20(11):1513-1528.

HI Krebs, N Hogan (2006) Therapeautic Robotics: a technology push. Proceedings of the IEEE. 94(9):1727-1738.

B.T. Volpe, H.I. Krebs, N. Hogan, L. Edelstein, C. Diels, M. Aisen (2000) A novel approach to stroke rehabilitation: robot-aided sensorimotor stimulation. Neurology 54:1938-1944.

\* cited by examiner

APPARATUS FOR UPPER BODY MOVEMENT

CROSS REFERENCE TO RELATED APPLICATIONS

This application is a 371 National Stage of International Application PCT/SG2013/000520 filed on Dec. 10, 2013 entitled, "AN APPARATUS FOR UPPER BODY MOVEMENT", which claims priority to U.S. Provisional Application No. 61/735,295 filed on Dec. 10, 2012 entitled, "AN APPARATUS FOR UPPER BODY MOVEMENT", both of which are incorporated herein by reference in their entirety for all purposes.

FIELD OF INVENTION

The invention relates to an apparatus for upper body movement, specifically for elbows and shoulders.

BACKGROUND

Stroke is a cerebrovascular accident recognized as the leading cause of neurological disability worldwide. Stroke can affect different areas of the brain and, due to death of affected neurological cells, the functionality of specific areas of the brain might be seriously compromised or lost. It has been estimated that among the 75% of stroke survivors, more than half will require specialized rehabilitation. Individuals are left with a broad range of disabilities, from mild paresis to complete paralysis of both the upper and lower extremities. Results from studies exploring the time course of recovery report that approximately 50% of the patients regain some functional abilities in the paretic upper extremity, whereas only 10% to 20% experience complete recovery [Kwak07].

Although neurological cells lose the ability to reproduce soon after the first years of life, there exists a spontaneous recovery process after stroke. A first physiological factor taking place at an early, or acute, phase after stroke is the resolution of the damaged tissue, with a decrease of swelling and bleeding. At the same time, lost functionalities are partly replaced by compensatory behaviors, which allow survivors to keep performing everyday motor tasks, although in an inefficient way. A second physiological factor taking place after stroke but with slower dynamics is phenomenon of plasticity. Despite the death of specific neurological cells, their function can be dynamically reallocated thanks to a diffuse and redundant network connecting different areas of the brain. The plasticity is an ongoing phenomenon since birth but it is enhanced soon after stroke and is strongly affected by the environment and "experience-associated neural changes have the potential to either hinder or enhance functional recovery" [Sch00].

The principle that plasticity is induced by motor practice, both active and passive, has inspired several neuro-rehabilitation techniques. However, the optimal training strategy for facilitating plasticity and functional reorganization has remained unclear thus far. One of the main reasons is that dose and consistency of therapy delivered by a therapist and outcomes as assessed via available clinical scales can be hardly compared across therapists. In this sense, robotic devices emerged as an objective means to deliver therapy and measure outcomes. Another reason is also due to the limited amount of therapy which a stroke survivor can be exposed to, exacerbated by an aging population, cost of health-care/therapy and insurance policies.

In this regard, rehabilitation robots have been developed to alleviate the burden on therapists and healthcare systems, while simultaneously increasing patient access to rehabilitation. Several studies have shown similar improvement in stroke survivor outcomes with the use of rehabilitation robotic devices when compared with conventional therapy. Robot-aided therapy complements conventional therapy with features such as exact repetitive movements, programmable resistance/assistance levels, objective evaluation, and motion sensing capabilities. Robots also represent a potential aid for therapists to extend rehabilitation to remote locations or to a patient's home.

Active participation to the therapy can be enhanced by virtual reality environments, where the concomitance of haptic and visual stimuli further increase the so-called Hebbian learning processes behind plasticity. In addition to this, robotic devices can accurately measure kinematic (e.g. position, speed) and dynamic (interaction forces) parameters, providing fine and objective assessment which complements the available clinical scales, such as the Fugl-Meyer, Wolf Motor Function, Stroke Impact Scale.

Many robotic devices have been developed which target post-stroke rehabilitation of the upper-limb [Bre07], however very few are commercially available and, in any case, their use in hospitals and clinics is still very limited due to high costs and complexity.

Figure 1:
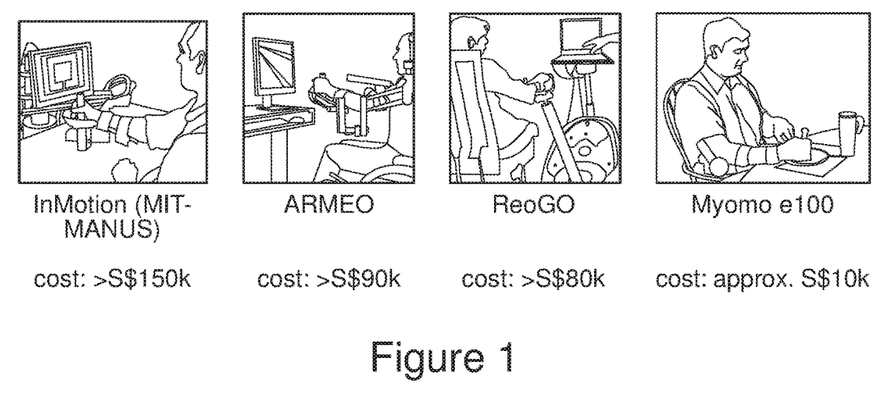
FIG. 1 shows examples of commercially available robots for shoulder/elbow rehabilitation.
Figure 2:
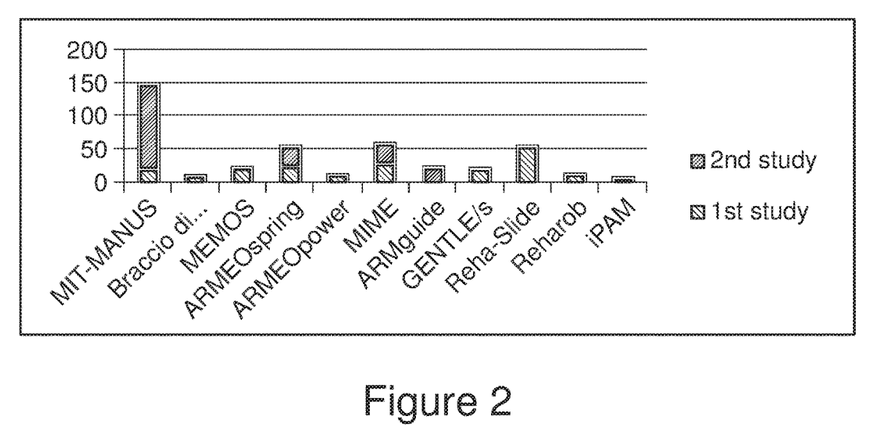
FIG. 2 shows a graph of sample sizes used in clinical studies for various robots.

At the moment, the only commercially available robots for elbow/shoulder rehabilitation are shown in FIG. 1. Other robots only exist as research prototypes, e.g [Gurg00], [Lum02], [Mice05], [Rein00], [Kre98], [Vol00], and have been used in clinical studies to validate their efficacy in rehabilitation. Sample sizes used in initial, pilot studies to prove clinical usefulness (for some robots more than two studies are available) are shown in FIG. 2. Among these, only four devices are of 2D planar, end-effector type, namely MIT-MANUS [Kre98], Braccio-di-Ferro [Casa09], MEMOS [Mice05], and Reha-Slide [Hess08]. Only the first three are in fact robots (as they entail actuation) while the Reha-slide is passive machine, as described later.

Figure 3:
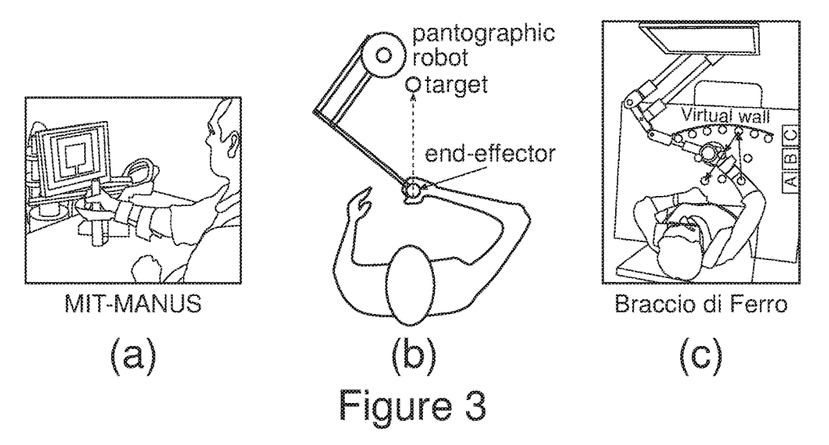

As shown in FIGS. 3(a) and 3(c) respectively, MIT-MANUS [Kre98] and Braccio-di-Ferro [Casa09] are functionally very similar. Meant for rehabilitation of the shoulder and elbow, both robots are based on the so-called pantographic mechanism (FIG. 3(b)) which ensures a so-called low intrinsic end-point impedance due to the very low inertia and friction properties of the mechanism, while able to impose large forces at the handle (up to 5 kg of continuous force). These characteristics allow both the MIT-MANUS and Braccio-di-Ferro to rapidly comply with the subject's movements. Both robots are also endowed with sensors which allow measuring the position and velocity of the handle as well as interaction forces between robot and patient. During the therapy, the subject's arm is attached to the end-effector (handle) of the robot. The subject moves the handle and performs goal-directed tasks, such as reaching a target, often guided by a videogame. The robots senses the current position and velocity (e.g. direction) of the reaching movement and is capable of exerting assistive or disturbing forces, or more general force fields, according to the therapy to be imparted. From a clinical evaluation perspective, the MIT-MANUS is the only commercially available robot in this category and also the most clinically studied device for upper-limb neuro-rehabilitation. Many random controlled trials (RCT) have shown statistically significant decrease of impairment, at the level of shoulder and elbow, for acute, sub-acute as well as chronic stroke survivors. These studies were performed on sample sizes which varied from twenty to one hundred and twenty seven subjects. A recent, multi-centre RCT study involving one hundred and twenty seven patients, showed that robot-assisted therapy was no better than usual therapy and intensive therapy after 12 weeks but that it was better than usual therapy after three months [Lo10].

Unfortunately, the MIT-MANUS and Braccio-di-Ferro robots (and similar devices) share the following drawbacks:
   lack of portability, limiting the potential use at home or community centres;
   high complexity, requiring highly trained personnel (to ensure safe operations as well); and
   high costs, meaning that only few and specialized clinics can afford (at most) one, thus limiting their availability to most of impaired subjects, especially those with mild impairments.

Figure 4:
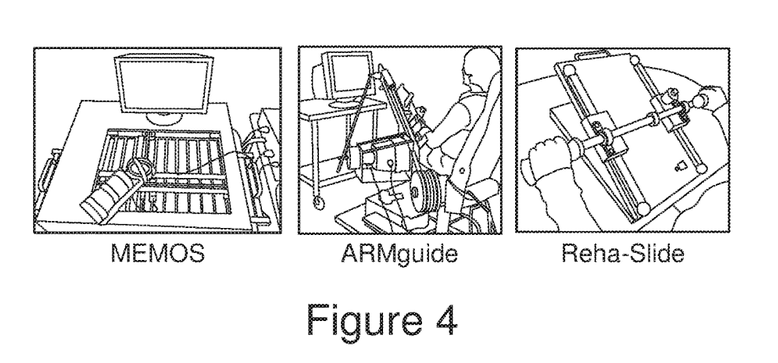
FIG. 4 shows examples of 2D cartesian robots and passive machines.

Referring to FIG. 4, the MEMOS [Mice05], ARM guide [Rein00] and the Reha-Slide [Hess08] are examples of two planar devices for neuro-rehabilitation of the shoulder/elbow meant to represent a trade-off between the best clinical efficacy and the least amount of robotic complexity. The Reha-Slide device, in fact, is not a robot but a lower cost passive machine designed for bi-manual arm training. The Reha-Slide is a one degree-of-freedom passive device whereby the patient uses the unaffected arm to aid the affected one, exercising the shoulder, elbow, and wrist. In a multi-centre RCT study, fifty-four sub-acute stroke survivors, over a six week period, received therapy with the Reha-Slide or electrical stimulation in addition to standard care. Significant improvement was found in both groups but no statistically significant difference [Hess08].

The ARM guide robot was designed to assess multi-joint coordination during fundamental to many activities of daily living such as reaching tasks. As reaching movements in healthy subjects are known to approximately follow straight-line trajectories, a passive, linear constraint with a single motor robot was used to assist in arm movement and to reduce complexity and costs typical of multi-degrees-of-freedom robots [Rein00]. A RCT study including nineteen patients showed that the therapy based on the ARM guide robot improved arm movement ability, although no difference was detectable with a group performing task-matched unassisted reaching tasks.

Unlike the ARM guide and the Reha-Slide, the MEMOS robot is based on a 2D planar mechanism in a Cartesian configuration. While this simplifies the kinematics and therefore the control, the issue with the MEMOS is that it simply readapts industrial robots design. Industrial robots, well known to be repeatable, implement position-controlled architectures, not suitable for the flexibility required for interacting with humans, whether healthy or impaired. Such flexibility can be achieved by means of admittance control, whereby force sensors are used to sense the human reaction forces and command appropriate actions. However, this approach has several limitations. Firstly, it relies on force sensors, typically expensive and noisy, making the system insensible to weak interactions. Secondly, in order to adapt quickly to changes of interaction forces, large motors should be used, making the system intrinsically unsafe for humans and exceedingly expensive. The inertia and friction of mechanisms, as perceived by the user, are typically high and cannot be sufficiently compensated for by means of active control. This is clearly an issue in rehabilitation as subject's movements are strongly influenced by the mechanical impedance of the robot [Cam09] while 'assist-as-needed' strategies are fundamental for increasing recovery.

SUMMARY

There is provided an apparatus for upper body movement. The apparatus comprises a H-shaped cable-driven mechanism; two motors for driving the H-shaped cable-driven mechanism; and a manipulandum coupled to the H-shaped cable-driven mechanism for independent movement along x and y axes. Each motor may be of a type selected from, for example DC motor, AC motor, magnetic linear actuator, pneumatic linear actuator and the like. The two motors may be controlled by a motor driver and a driving force of the two DC motors may be determined by a position of the manipulandum. The driving force of the two DC motors is determined using the following equations:

$$\begin{bmatrix} i_L \\ i_R \end{bmatrix} = K_i A^{-1}(\alpha B_c + \beta B_d)(A^{-1})^T \begin{bmatrix} \omega_L \\ \omega_R \end{bmatrix}$$

and $$\begin{bmatrix} V_L \\ V_R \end{bmatrix} = \begin{bmatrix} R_L & 0 \\ 0 & R_R \end{bmatrix} \begin{bmatrix} i_L \\ i_R \end{bmatrix} + \begin{bmatrix} K_{e,L} & 0 \\ 0 & K_{e,R} \end{bmatrix} \begin{bmatrix} \omega_L \\ \omega_R \end{bmatrix}.$$

Preferably, the H-shaped mechanism is configured in a form of a differential mechanism such that a user holding the manipulandum experiences low inertia. The manipulandum includes a horizontal carriage; a solid base mounted to the horizontal carriage; a six degree of freedom force/torque sensor mounted to the solid base; a plurality of idler pulleys; and a plurality of vertical carriages. The manipulandum can also include a handle, which may be a separate part of the manipulandum.

The apparatus can also include a plurality of guides arranged along the x and y axes; a plurality of idler pulleys; and a driving pulley coupled to each motor. It is preferable that a cable of the H-shaped cable-driven mechanism is wound at least four turns around the driving pulley coupled to each motor.

Advantageously, four force channels are available, horizontal and vertical channels being obtained by mechanically blocking the horizontal/vertical carriages, and 45° channels being obtained by blocking the driver pulley.

DESCRIPTION OF FIGURES

In order that the present invention may be fully understood and readily put into practical effect, there shall now be described by way of non-limitative example only preferred embodiments of the present invention, the description being with reference to the accompanying illustrative figures.

FIGS. 3 (a)-(c) show examples of 2D planar robots based on a pantographic mechanism.

FIGS. 7 (*a*)-(*b*) show graphical representations of differential movements which the present invention can undergo.

FIGS. 11 (*a*)-(*e*) show photographs of various pulleys used in the present invention.

FIGS. 13 (*a*)-(*b*) show a further enhancement of the present invention.

DESCRIPTION OF PREFERRED EMBODIMENTS

The preferred embodiments of the present invention may provide an apparatus for upper body movement, specifically for elbows and shoulders. The apparatus can be used for applications such as, for example, surgical training, tele-operation, game playing, and most pertinently, rehabilitation. For example, a surgeon grasps a manipulator's handle of the apparatus as if it were a scalpel, and a virtual organ is displayed on a computer screen. The surgeon then moves the handle as if he were cutting the organ with a scalpel. The apparatus then records the trajectory/force and the apparatus can introduce disturbances along the path to simulate anomalies in the organ. Although the apparatus is not suitable to all patients (e.g. the severely impaired ones) undergoing rehabilitation, a large proportion of patients will be able to benefit from use of the apparatus. The low cost to fabricate the apparatus ensures that the apparatus is able to be readily deployed in hospitals, community centres and private homes. Furthermore, the apparatus complements current robotic therapies and allows patient-robot interaction, enabling early discharge and continuous monitoring/training of patients.

Figure 6:
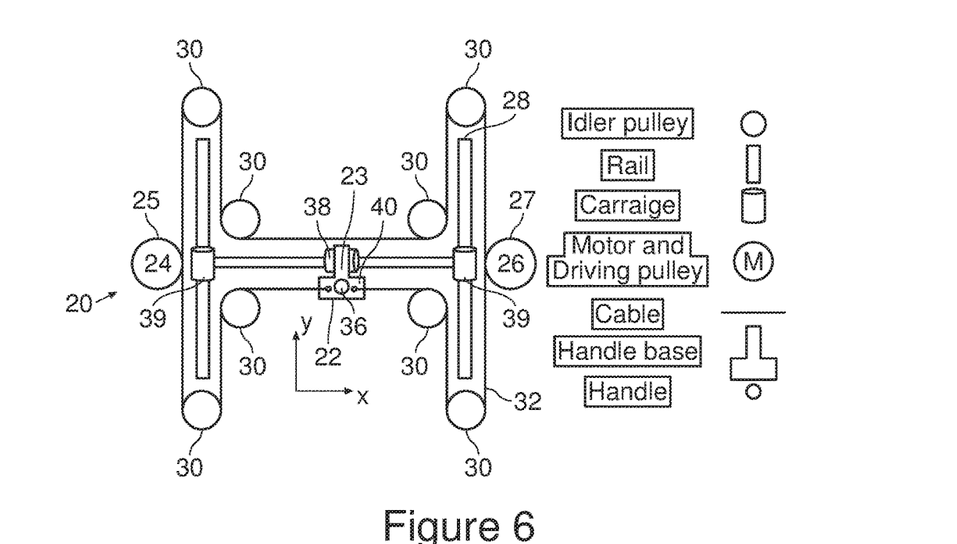
FIG. 6 shows a schematic top view of the present invention.
Figure 9:
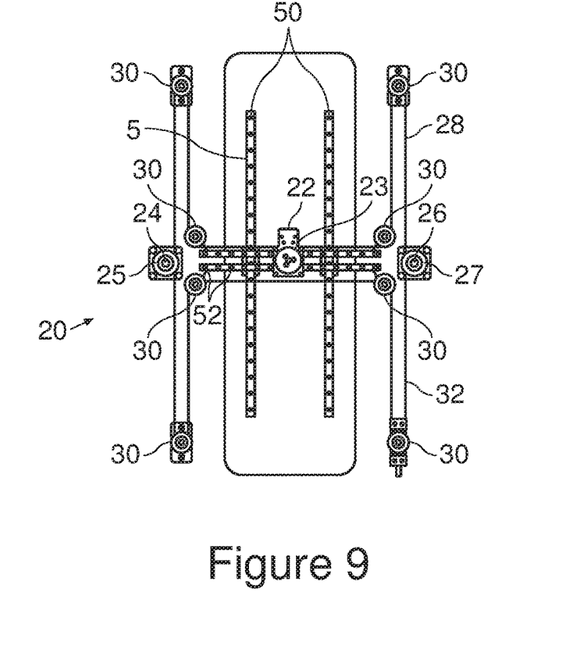
FIG. 9 shows a mechanical drawing of the present invention.
Figure 10:
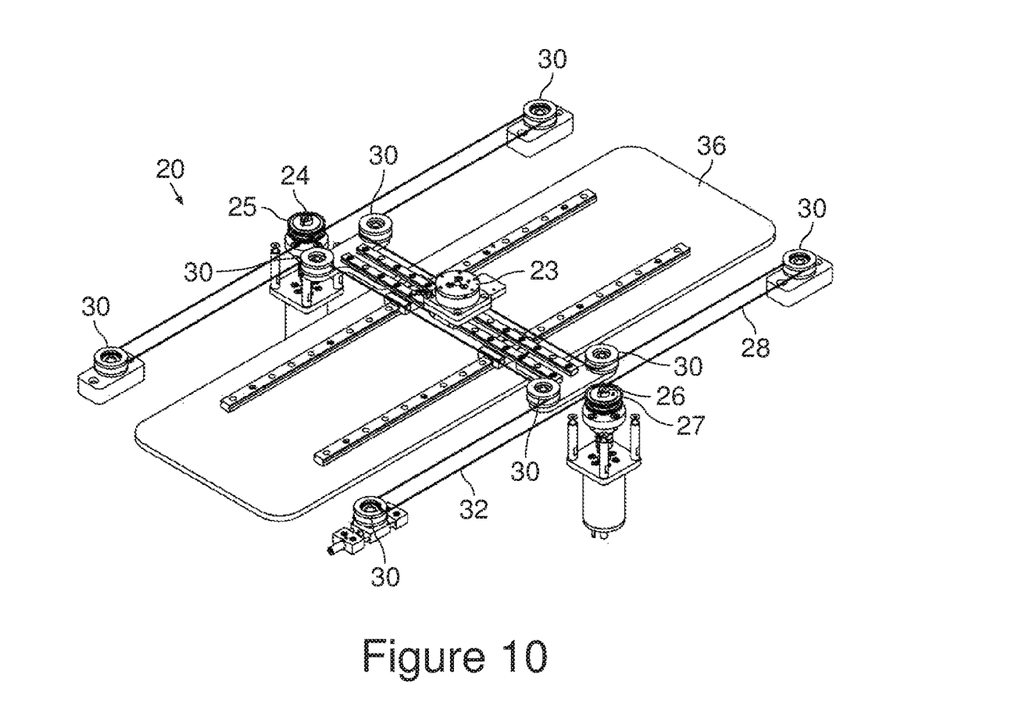
FIG. 10 shows a photograph of the present invention.
Figure 11:
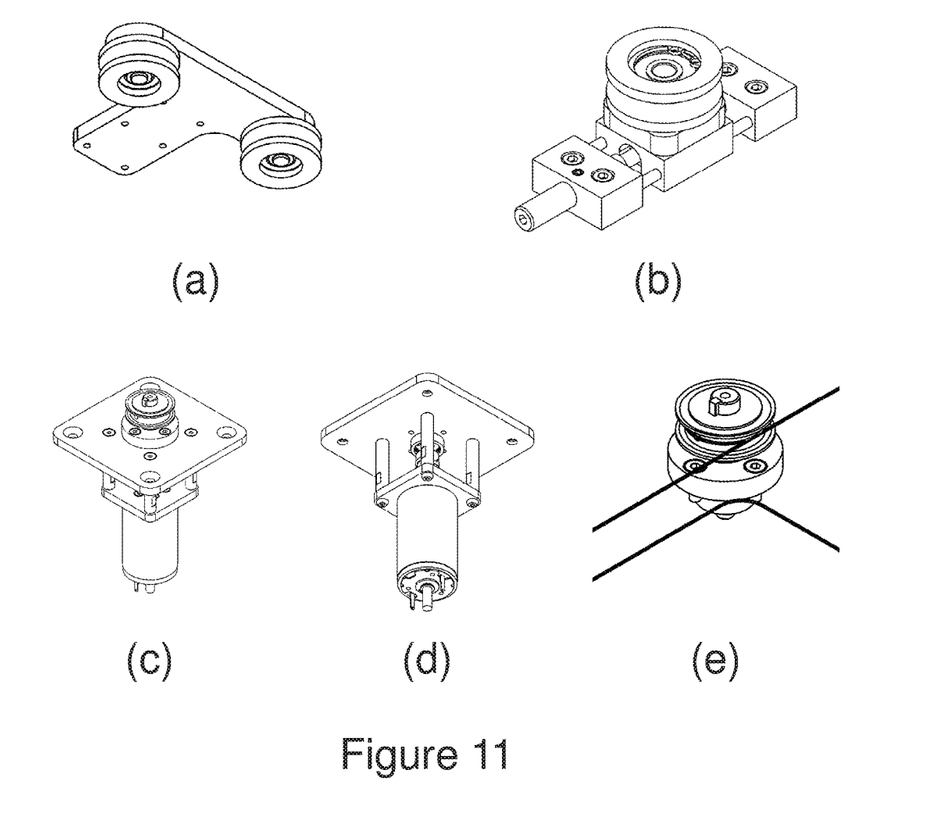

FIG. 6 shows a schematic top view of the apparatus 20 (in this instance used for upper body rehabilitation), FIG. 9 shows the schematic diagram of the apparatus 20 and FIG. 10 shows a photograph of an example implementation of the apparatus 20. The apparatus 20 includes a handle 36 on a manipulandum 22, a six degree of freedom force/torque sensor 23 (for example, ATI Mini40 with 80 N and 4 Nm sensing range), two DC-motors 24, 26 controlled by a motor driver and a PC with a data acquisition system (not shown). The handle 36 is a main component of the apparatus-user interface, but it should be appreciated that the handle 36 need not be a separate object. The manipulandum 22 can be shaped in a physical form which facilitates gripping by a user's hand. The force/torque sensor 23 is configured to measure the force/torque transmitted between the manipulandum 22 and the user's hand while gripping the handle 36.

The driver and the PC with a data acquisition system may be scalable down to a microcontroller form. For a haptic device, a data acquisition system is required to read the position of the manipulandum 22 and to provide instructions to control an output force of the motors 24, 26 which will be transferred to the manipulandum 22. In our current implementation, a PC with a real-time control platform (dSPACE, Germany) is used to read the position of the manipulandum 22 (via a linear encoder attached to the motors 24, 26) and to send an output signal to control the output current to the motors 24, 26 via the motor driver.

The force transmission from DC-motors 24, 26 to the manipulandum 22 is carried out through an H-shaped cable-driven mechanism 28. It may be possible to adopt an A-shaped cable-driven mechanism, but such a shape would introduce more issues/complexity, such as, for example, asymmetric friction, position-dependant impedance, more complex kinematics and so forth. The DC-motors 24, 26 are shown with driving pulleys 25, 27 directly connected to the motors 24, 26 respectively. The driving pulleys 25, 27 transfer the force to a cable 32 which is routed through eight idler pulleys 30 (for example, diameter of 20 mm with 6 mm bearing inside, Misumi AFBD9-20) in the H-shaped cable-driven mechanism 28. Ultimately the force is directly transferred to the carriages (and ultimately the manipulandum 22), with minimal friction losses.

The handle 36 (made from peek rod) is connected rigidly to a horizontal carriage 38. A mounting is fixed to a solid base 40 to mount the six degree of freedom force/torque sensor. The handle 36 (of sample dimensions 25 mm×65 mm) is mounted on top of the six degree of freedom force/torque sensor 23. The solid base 40 is mounted to the horizontal carriage 38. The manipulandum 22 also includes four idler pulleys 30 (from the eight idler pulleys 30 mentioned earlier) and two vertical carriages 39.

The apparatus 20 has a configuration in a form of a differential mechanism which enables independent movement of the manipulandum 22 along x and y axes despite having just one cable loop. Another advantage of this configuration is that both actuators are grounded hence a user holding the manipulandum 22 experiences low inertia. Moreover, a Cartesian approach in the manipulandum 22 is obtained by the linear guides/rails of the H-shaped cable-driven mechanism 28. This configuration ensures homogeneous inertia and friction throughout a whole workspace of the apparatus 20.

Figure 7:
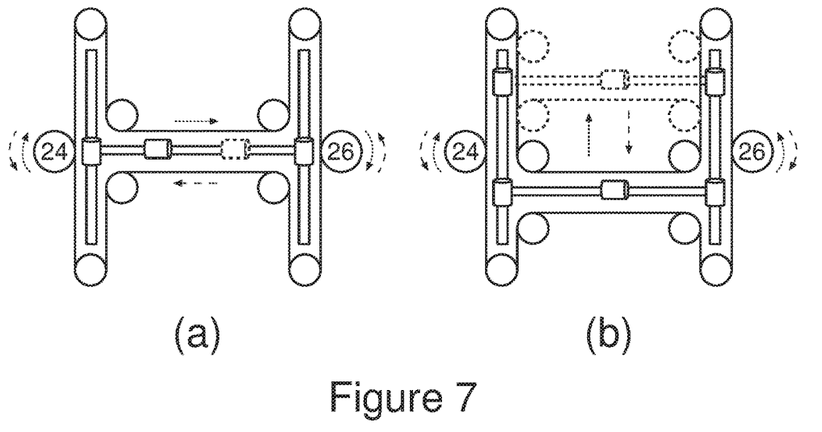

The apparatus 20 is configured to provide planar (i.e. in the xy plane) differential motion. A differential mechanism is a device that produces resultant motion as sum or difference of the component motions, an example of cabled differential for rotary motions can be found in [Sal193]. In the apparatus 20, one movement in one axis is obtained by the sum of the rotation of the motors, while the other is obtained by the difference. This differential movement is represented graphically in FIG. 7. To produce movement in the x axis, DC-motors 24, 26 must rotate in same directions (i.e. either both clockwise or both counter-clockwise), while for that in y axis, in opposite directions. So, FIG. 7(*a*) shows both DC-motors 24, 26 rotating in a clockwise direction to produce movement of the manipulandum 22 in a positive x direction and in FIG. 7(*b*), both DC-motors 24, 26 rotate in opposite directions to produce movement of the manipulandum 22 in positive y direction. It should be noted that during x axis movement, only the horizontal carriage 38 moves (together with the handle 36 and force/torque sensor 23). However for y axis movement, the moving parts are more, i.e. all carriages 38, 39 with 4 idler pulleys 30. Hence, in order to reduce the inertia experienced by the user, lightweight components are necessary. It should be appreciated that the motors 24, 26 can also be in a form of AC motors, linear actuators (magnetic or pneumatic), or any device which is able to produce actuation.

The apparatus 20 sits on an aluminum table structure (for example, a 30×60 mm aluminum frame), and is suitable for table-top use. Two sets of lightweight stainless steel parallel rails, one on top of the other, are used to implement a 2D Cartesian mechanism. Vertical rails 50 allow for movement of the manipulandum 22 in Y axis, and may be 470 mm long miniature linear guides from Misumi (SSELB13-470), mounted 108 mm apart on a 6 mm clear plastic plate.

Horizontal rails 52 mounted above the vertical rails 50 allow for movement of the manipulandum 22 in X axis, and may be 275 mm long miniature linear guides from Misumi (SEBZ10-275). The smaller set of rails 52 contributes to the total inertia that the subject has to move for movement in y axis. In this example, by leaving out the length of the carriage (45 mm) and end stoppers at the linear guides, the total Cartesian work space of the mechanism is 221 mm (x)×441 mm (y).

An H configuration of cable 32 is required for the differential driving system for the mechanism 28 with two driving motors 24, 26. As shown in FIG. 10, the H-shaped cable-driven mechanism 28 is constructed using eight idler pulleys 30, four of which are fixed to two T-shaped custom made mounting plates (as shown in FIG. 10(*a*)) which are fixed at the bottom side of the top rails. Six mm male end threaded cantilever shafts are used to fix the pulleys 30 to the mounting plates. The other four idler pulleys 30 are installed at the 4 ends of the mechanism 28, three of which are fixed to the aluminum table structure while one at the bottom right hand side is mounted on top of the lead screw guide unit (for example, Misumi XKNEJ20, as shown in FIG. 10(*b*)) to enable the adjustment of pretension of the cable 32. Clear plastic spacers are used to adjust the height of the idler pulleys 30 to align the grooves of the idler pulleys 30 into a single horizontal plane. The use of spacers ensures that the cable 32 is maintained in a substantially horizontal plane to minimize vertical loading of the idler pulleys 30 which will cause additional friction.

For the actuation of the mechanism 28, the driving pulleys 25, 27 (for example, having diameter 27.5 mm) are used at the middle in tangent to the long side of the outer cable line of the mechanism 28. The driving pulleys 25, 27 are mounted on a clear plastic plate with a double bearing unit (for example, Misumi BGCBB623ZZ-20) driving shaft. The motors 24, 26 are mounted directly under the driving pulleys 25, 27 with four circular posts (both-ends female thread, for example, Misumi ETKR6-15) connecting motor mounting plate and pulley mounting plate (FIGS. 10(*c*) and 10(*d*) respectively). A six mm coupler (for example, Misumi MCO15-6) connects the motors 24, 26 and the driving pulley shaft. There is a need for two motors 24, 26, as in an instance when only a single motor is used, there can only be one degree of freedom. Even if a set of gears is incorporated to establish a mechanical relation between the driving pulleys 25, 27, the manipulandum 22 will only be able to move at one speed/trajectory. For example, if the driving pulleys 25, 27 are coupled with a 1:1 transmission, the manipulandum 22 will only move in a left-right manner. If the driving pulleys 25, 27 are coupled with a −1:1 transmission, the manipulandum 22 will only move in an up-down manner. If the driving pulleys 25, 27 are coupled with a 1:2 transmission, the manipulandum 22 will only be able to move along a straight line at a pre-defined angle. It should be appreciated that varying the gear ratios (akin to a continuous variable transmission gear system in cars) would require a second motor.

In this embodiment, 0.54 mm nylon coated steel wire rope (7×7) (for example, Asahi Intecc NB45-61) was selected for the cable 32. Due to its flexibility, it is easy to combine it for use with small pulleys like those used in the mechanism 28, hence allowing the possibility to scale down the working space with minimum effort. The cable 32 is routed through eight pulleys as shown in FIG. 9 to form an H configuration and is wrapped at least four turns around the each driving pulley 25, 27 (as shown in FIG. 10(*e*)). The more turns around each driving pulley 25, 27, the lower the likelihood of slippage due to the higher friction. However, the pulley 25, 27 will have to be able to have the physical dimensions to accommodate the winding of the cable 32. The friction provided from the at least four turns of the cable 32 at each driving pulley 25, 27 can hold 50 N of force at the handle 36 when both driving pulleys 25, 27 are hampered. Both ends of the cable 32 are fixed to a bottom mounting plate of a torque sensor at a distal side of the mechanism 28.

As an example, Faulhaber's DC Micromotors (3863H012C) are chosen to drive the manipulandum 22. They are light and compact (400 gram, 38 mm diameter, 63 mm length) but it can produce significant amount of torque (1424 mNm stall torque). By attaching a 27.5 mm diameter pulley to the motor shaft, 25 N force can be generated by each motor to move the driving pulley. This amount of force is at the same order as the arm force to move the handle in general, though still below what the arm can produce maximally. For rehabilitation purpose, a more powerful motor may be needed if for example the patient has a very minimum muscle power and the robot is required to assist his/her motion to achieve a certain goal. For motor control experiments, the force generated by this particular setup is sufficient to provide perturbation.

To drive the motor, Faulhaber 4 quadrant PWM motion controller (MCDC3006, 65×58×27.5 mm$^3$) may be used. It has its own ROM, an RS232 interface, and an analog input so that it can be programmed to accept a voltage input to be used as the voltage sent to the motor. Using a simple DC motor allows control of current supply by controlling the voltage sent to the motor.

Faulhaber optical encoder (HEDL5540) may be attached to the shaft of each motor. It has a resolution of 500 lines per revolution, thus for a 27.5 mm pulley diameter, its resolution is <0.2 mm in the xy plane. The encoder count is acquired through an input port on the dSPACE system. The dSPACE system is then programmed to provide an analog output which controls the voltage to be sent to the motor through the driver. The programming is done using Simulink and the program is compiled to the dSPACE memory with Simulink Coder.

Due to the differential mechanism of the apparatus 20, the forces at the end-effector depend on the torque generated at the motor shaft according to the following equations:

$$\begin{bmatrix} F_x \\ F_y \end{bmatrix} = A \begin{bmatrix} \tau_L \\ \tau_R \end{bmatrix} \quad (1)$$

$$\begin{bmatrix} v_x \\ v_y \end{bmatrix} = (A^{-1})^T \begin{bmatrix} \omega_L \\ \omega_R \end{bmatrix} \quad (2)$$

$$A = \frac{1}{r}\begin{bmatrix} -1 & 1 \\ -1 & -1 \end{bmatrix}$$

where the variables with x and y subscript are with respect to the xy coordinate frame as defined in FIG. 6, and the variables with L and R subscript are with respect to the DC-motors 24, 26 respectively. So $\tau_L$ and $\tau_R$ are the torques exerted by the DC-motors 24, 26, while the ω's are the angular velocity of the shaft of DC-motors 24, 26. $F_x$ and $F_y$ are the force components at the handle. $v_x$ and $v_y$ are the velocity components at the handle 36. The variable r is the radius of the driving pulleys 25, 27 attached to the motor shaft, i.e. 0.5*25.5 mm=13.75 mm.

A possible family of perturbation force fields is the velocity dependent fields, which can comprises damping and/or Coriolis' fields. In both cases the force $F_H$ at the handle is proportional to the handle velocity $v_H$ $$F_H = Bv_H \quad (3)$$

$$\begin{bmatrix} F_x \\ F_y \end{bmatrix} = B \begin{bmatrix} v_x \\ v_y \end{bmatrix}$$

The perturbation B in our setup may consist of two components, Coriolis field—$B_c$, and damping field—$B_d$, parameterized as $\alpha$ and $\beta$ $$B = \alpha B_c + \beta B_d \quad (4)$$

$$B = \alpha \begin{bmatrix} 0 & b_{cz} \\ -b_{cy} & 0 \end{bmatrix} - \beta \begin{bmatrix} b_{dx} & 0 \\ 0 & b_{dy} \end{bmatrix}$$

where all the b's are positive numbers.

Substituting eqs (1) and (2) to (3), we can rewrite the perturbation equation with respect to the motors $$\begin{bmatrix} \tau_L \\ \tau_R \end{bmatrix} = A^{-1} B (A^{-1})^T \begin{bmatrix} \omega_L \\ \omega_R \end{bmatrix} \quad (5)$$

Hence once we obtain the angular velocity of the shaft of the DC-motors 24, 26, read via encoders, we can calculate the amount of torque that the DC-motors 24, 26 have to produce for the perturbation. To control the generated torque, we will assume that it is linearly proportional to the amount of current supplied to the DC-motors 24, 26.

$$\begin{bmatrix} i_L \\ i_R \end{bmatrix} = \begin{bmatrix} K_{i,L} & 0 \\ 0 & K_{i,R} \end{bmatrix} \begin{bmatrix} \tau_L \\ \tau_R \end{bmatrix} \quad (6)$$

$$\begin{bmatrix} i_L \\ i_R \end{bmatrix} = K_i \begin{bmatrix} \tau_L \\ \tau_R \end{bmatrix}$$

where $K_{i,L,R}$ are the current constant ($K_i$ is $1/K_t$ in FIG. 7).

In conclusion, the feedforward model is $$\begin{bmatrix} i_L \\ i_R \end{bmatrix} = K_i A^{-1} (\alpha B_c + \beta B_d)(A^{-1})^T \begin{bmatrix} \omega_L \\ \omega_R \end{bmatrix} \quad (7)$$

Apart from the input (angular velocity) and output (current), all the variables are constant numbers and all the operations are just matrix multiplication. The inverse of matrix A can be calculated beforehand since A is known. The system is programmed to receive values of $\alpha$ and $\beta$ from the user to determine the type of perturbation. The simplicity of this model enables it to be implemented in the low cost microprocessor.

Figure 12:
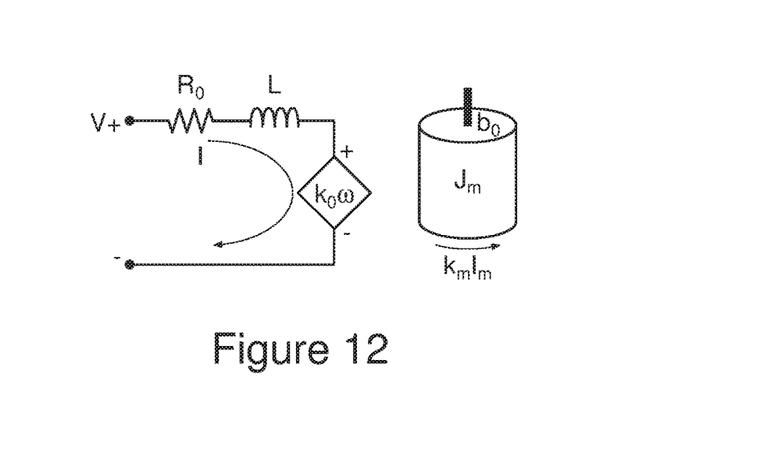
FIG. 12 shows a DC motor electromechanical model which is employed in the present invention.

As mentioned earlier, the motor driver only supports voltage control and not current control. So we have to provide a model relating the current and voltage. Based on classical DC motor models, as shown in FIG. 12, the following equations can be applicable for the 2-motor system:

$$\begin{bmatrix} V_L \\ V_R \end{bmatrix} = \begin{bmatrix} R_L & 0 \\ 0 & R_R \end{bmatrix} \begin{bmatrix} i_L \\ i_R \end{bmatrix} + \begin{bmatrix} K_{e,L} & 0 \\ 0 & K_{e,R} \end{bmatrix} \begin{bmatrix} \omega_L \\ \omega_R \end{bmatrix} \quad (8)$$

where $V_{L,R}$ and $i_{L,R}$ are the voltages and currents at the terminals of M1 and M2, $R_{L,R}$ is the electrical resistance of the armature, and $K_{e,L,R}$ is the back-EMF constant.

Putting everything together in equation, we have the feedforward model $$\begin{bmatrix} V_L \\ V_R \end{bmatrix} = (RK_i A^{-1} B(A^{-1})^T + K_e) \begin{bmatrix} \omega_L \\ \omega_R \end{bmatrix} \quad (9)$$

with B defined in eq (6). It should be noted that eq (9) is needed because of the particular motor driver that we use here, otherwise for a driver that is able to incorporate current control, eq (7) and (8) are sufficient.

A basic requirement for the next generation of the apparatus 20 is the possibility to implement adaptive impedance control which is currently used in commercial MIT-MANUS and which is key to the Performance-Based Progressive Therapy (PBPT) used on the largest clinical study (127 patients) with a MIT-MANUS [Lo10] to date. This approach incorporates the concept of 'assist-as-needed' whereby the patient attempts a movement and the therapist manually helps complete the movement, only when needed.

The details of the adaptive impedance control are fully described in [Kre03], here we will just recall the basic characteristics. Subjects are asked to perform goal-directed reaching, as shown in FIG. 12-*a*, from a central target ($x_0$) to a peripheral target ($x_T$).

Healthy subjects are known to perform reaching movements along straight lines and following a so-called minimum-jerk trajectory [Kre03]:

$$s(t) = x_0 + (x_T - x_0) \cdot \left[ 10 \left( \frac{t}{t_f} \right)^3 - 15 \left( \frac{t}{t_f} \right)^4 + 6 \left( \frac{t}{t_f} \right)^5 \right]$$

so that $s(t) = x_0$ at start ($t=0$) and $s(t) = x_T$ at final time $t = t_f$.

Impaired subjects, in general, will neither follow straight lines nor move along smooth trajectories. Some subjects might not even be able to start moving and will require assistance. Unlike standard industrial robotic devices, robots such as the MIT-MANUS and the apparatus 20 will be able to generate impedance-like force fields to guide the movement, just like a therapist guiding the patient hand-in-hand.

Figure 13:
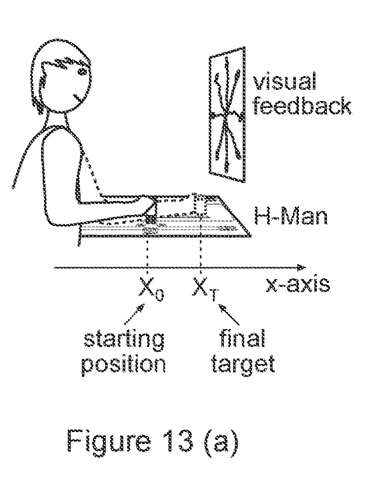

The trajectory s(t) can be seen as a 'virtual hand', moving from $x_0$ to $x_T$. If the subject is able to move fast enough, his/her hand would in general move ahead of the virtual hand. If a subject is unable to move or is too slow, the position of the subject's hand x(t) at a certain time t will lag behind the virtual hand s(t). FIG. 13(*a*) shows the apparatus 20 in use.

As shown in FIG. 13(*b*), whenever x(t) lags behind s(t) the subject will experience an assistive force field (≈). If a subject overshoots the target, he/she would then experience a resistive force field (≈). Similarly, lateral fields (acting perpendicularly to the x-direction, but not shown in FIG. 13) will help the subject follow straight lines.

The force fields implemented in the impedance controller are a combination of elastic and damping fields. Damping fields produce torques proportional, via a coefficient typically set around B=10 Ns/m, to movement speed and always against the actual movement direction. Also for very jerky motions, speed will rarely exceed 20 cm/s, therefore damping torques will rarely exceed 2 N (approximately 0.2 Kg of force) which can be considered a very low force. On the other hand, elastic fields might produce much larger forces, depending on the specific subject, and this needs to be taken into account in the early phases of design as well as recruitment. For example, the assistive field ($\approx$) in FIG. 13(b) schematically represents the field of a virtual spring connected between the subject's hand at position x(t) and the virtual hand at position s(t). The virtual spring implemented in the MIT-MANUS has a stiffness coefficient k=200 N/m, so that an elastic force F=k*(x−s), i.e. a force proportional to the distance between subject's hand (x) and virtual hand(s). Peripheral targets are 15 cm away from the central target. This means that if a severely impaired subject is unable to move towards a target, the virtual spring should generate forces as high as 200 N/m*15 cm=30 N, i.e. approximately 3 Kg of force.

This is a considerable amount of force, in fact close to the limits of the apparatus 20. Larger forces require larger motors, making the system more expensive and less safe. As the apparatus 20 is meant for subjects with mild impairments who would require some level of assistance but who would still be able to move, smaller motors would be preferable.

The behavior of the user (e.g. speed, jerkiness and so forth) will be monitored during the task. The movement time of the virtual hand $t_f$ can be adjusted from trial to trial in order to assist-as-needed or to challenge the subject to do better/faster. Krebs et al [Kre03] describe in detail the adaptive algorithm used to tune the reaching time $t_f$ to a specific subject's needs, based on his/her performance during previous trials. This concept is at the basis of the Performance-Based Progressive Therapy.

Figure 5:
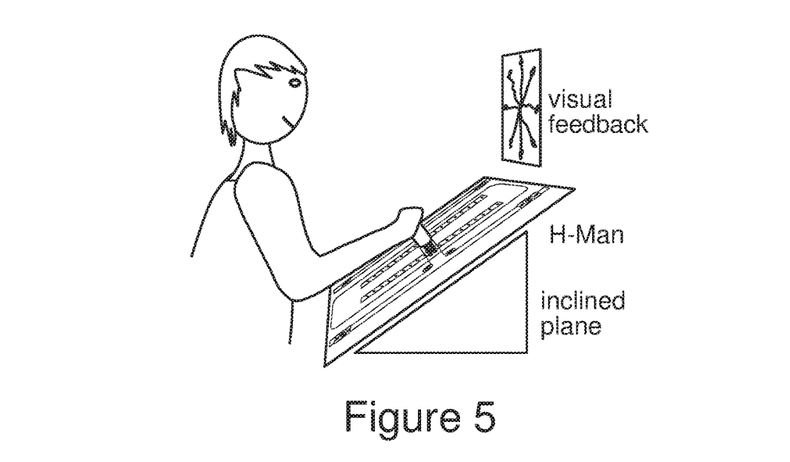
FIG. 5 shows a possible application of the present invention.

A fundamental part of the robot-aided therapy is the goal-directed therapeutic gaming aspect, which is used to motivate and guide the patient through the training session. A possible rehabilitation scenario is shown in FIG. 5 whereby the apparatus can be placed on an inclined surface. It should be appreciated that due to homogeneous inertia, a simple counter weight can be used to balance against gravity when using the inclined surface. The user sits in front of the apparatus 20 and faces a computer screen with a video-game which motivates and guides the user through a series of motor tasks, typically reaching peripheral targets starting from a central one. Healthy subjects are expected to perform reaching tasks by moving along straight lines, with the apparatus 20 being used to generate assistive/resistive force fields to correct the trajectories of the user, as described in the preceding paragraphs.

The apparatus 20 can be easily manufactured mostly with off-the-shelf components and via a microcontroller, implementing the real-time control, connected to a regular PC (where the video games would be implemented). With its low cost, multiple systems can be employed in hospitals or even community centres, enabling step-down care. It is possible to separate the software for the control of the robot from the user interface. The robotic platform can be made portable with a serial port connectivity as its output. This serial port can be connected directly to any computer which has the user interface software installed within. Hence an understanding of the user interface and of the apparatus 20 is all which is required.

Figure 8:
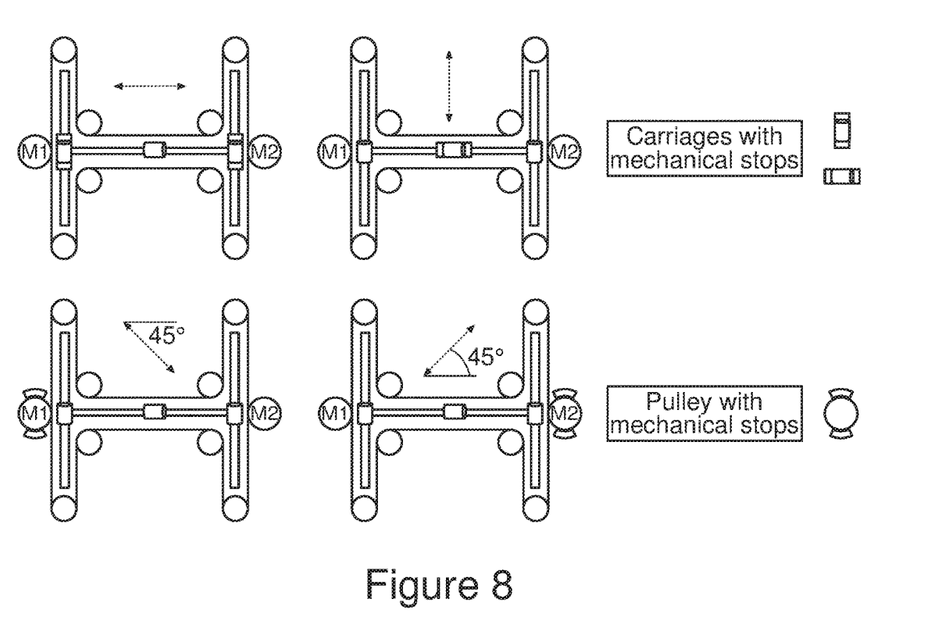
FIG. 8 shows graphical representations of movements which the present invention can undergo.

The use of the planar differential mechanism used in the apparatus 20 provides the following advantages:

i. The user will experience the same inertia, friction, and damping in every point of the workspace, i.e. homogeneous impedance. This feature is not necessarily available in any robotic manipulandum and non-homogenous impedance might lead to arm trajectories which are curved rather than straight as expected, for example, during reaching tasks.
ii. Another significant advantage of having this type of Cartesian differential mechanism is the simplicity of the mechanism resulting in easier control. It will be shown later that the calculations for controlling the mechanism involve only simple algebra without any trigonometric/logarithmic functions or online matrix inversions. As a result, a simple microcontroller can execute all the operations in real time, hence reducing the complexity and therefore the cost of the system.
iii. Finally, the so-called "force channels" can be implemented by means of simple mechanical stops. Some experimental paradigms make use of force channels to guide the subject's arm along predefined straight lines (e.g. horizontal, vertical, or oblique). Typically, the channel is implemented by actively, i.e. by means of very powerful actuators which generate canyon-like potentials with steep walls to allow motion only along the canyon, e.g. see [Krebs03]. When using the apparatus 20, channels in four different directions are passively obtained by mechanical stops. The actuator does not need to be oversized to generate large channel forces, hence increasing the safety of the system by using low power actuators. Four channels are available in our system (see FIG. 8), the horizontal and vertical channels are obtained by mechanically blocking the carriages, while the 45° channels by blocking the driving pulleys or motor shafts. Passive vertical and horizontal channels are possible only in Cartesian mechanisms like the apparatus 20. Oblique channels are a direct consequence of the differential transmission.

Unlike conventional machines or robots which are based on complex designs (often readapting industrial mechanisms) to match all possible conditions and severities of impairments, the apparatus 20 has been primarily conceived to be intrinsically lightweight, portable and simple. In particular, its mechanism makes use of the planar cabled differential with properties potentially beneficial to rehabilitation:

a) lightweight and therefore portable: as only these characteristics will allow use in remote locations and at home.
b) low-cost and therefore accessible: If only few and specialized clinics can afford (at most) one robot, only few patients will have access to it and for a very limited time.
c) intrinsically simple and safe: complex and strong robots can harm and therefore require highly trained personnel to be operated.

Whilst there have been described in the foregoing description preferred embodiments of the present invention, it will be understood by those skilled in the technology concerned that many variations or modifications in details of design or construction may be made without departing from the present invention.

REFERENCES

[Bre07] Brewer B R, McDowell S K, Worthen-Chaudhari L C (2007) Poststroke Upper Extremity Rehabilitation: A Review of Robotic Systems and Clinical Results. Topics in Stroke Rehabilitation 14(6):22-44

[Cam09] Campolo D, Accoto D, Formica D, Guglielmelli E (2009) Intrinsic Constraints of Neural Origin: Assessment and Application to Rehabilitation Robotics. IEEE Trans. on Robotics (Special Issue on 'Rehabilitation Robotics') 25(3):492-501

[Casa09] Casadio M, Giannoni P, Morasso P, Sanguineti V (2009) A proof of concept study for the integration of robot therapy with physiotherapy in the treatment of stroke patients. Clin Rehabil 23: 217-228

[Col08] Colombo R, Pisano F, Micera S, Mazzone A, Delconte C, Carrozza M C, Dario P, Minuco G (2008) Assessing Mechanisms of Recovery During Robot-Aided Neurorehabilitation of the Upper Limb, Neurorehab. and Neural Repair, 22:50-63.

[Dip07] L. Dipietro, H. I. Krebs, S. E. Fasoli, B. T. Volpe, J. Stein, C. Bever and N. Hogan (2007) Changing Motor Synergies in Chronic Stroke. Neurophysiol 98:757-768.

[Gurg00] C. G. Burgar, P. S. Lum, P. C. Shor, M. Van der Loos (2000) Development of robots for rehabilitation therapy: the Palo Alto VA/Stanford experience. J Rehabilitation Research and Development 37:663-73.

[Hess08] S Hesse, C Werner, M Pohl, J Mehrholz, U Puzich, and H I Krebs (2008) Mechanical arm trainer for the treatment of the severely affected arm after a stroke: a single-blinded randomized trial in two centers," Am J Phys Med Rehab 87(10):779-88.

[Kahn06] L E Kahn, M L Zygman, W Z Rymer, D J Reinkensmeyer (2006) Robot-assisted reaching exercise promotes arm movement recovery in chronic hemiparetic stroke: a randomized controlled pilot study, J Neuroeng Rehabil, 3(12)

[Kre03] H I Krebs et al (2003) Rehabilitation Robotics: Performance-Based Progressive Robot-Assisted Therapy, Autonomous Robots 15, 7-20.

[Kwak07] Kwakkel G, Kollen B (2007) Predicting improvement in the upper paretic limb after stroke: A longitudinal prospective study. Restorative Neurology and Neuroscience 25:453-460

[Lang07] Langhorne P, Widen-Holmqvist L (2007), Early supported discharge after stroke, Journal of Rehabilitation Medicine, 39:103-108.

[Lo10] Lo et al. (2010) Robot-assisted therapy for long-term upper-limb impairment after stroke, New Engl J Med 362(19):1772-83

[Lum02] P. Lum, D. J. Reinkensmeyer, R. Mahoney, W. Z. Rymer, C. Burgar (2002) Robotic devices for movement therapy after stroke: current status and challenges to clinical acceptance. Top Stroke Rehabilitation 8:40-53

[Lu11a] Lu E C, Wang R H, Hebert D, Boger J, Galea M P, Mihilidis A (2011) The development of an upper limb stroke rehabilitation robot: identification of clinical practices and design requirements through a survey of therapists. Disability and Rehabilitation: Assistive Technology, 6(5): 420-431

[Lu11b] Lu E C, Wang R H, Huq R, Gardner D, Karam P, Zabjek K, Hebert D, Boger J, Mihilidis A (2011) Development of a robotic device for upper limb stroke rehabilitation: A user-centered design approach, PALADYN Journal of Behavioral Robotics 2(4):176-184

[Mice05] S. Micera, M. C. Carrozza, E. Guglielmelli, G. Cappiello, F. Zaccone, C. Freschi, R. Colombo, A. Mazzone, C. Delconte, F. Pisano, G. Minuco, P. Dario (2005) A Simple Robotic System for Neurorehabilitation. Autonomous Robots 19:271-284.

[Mor81] P. Morasso (1981) Spatial control of arm movements. Exp Brain Res 42:223-227

[Rein00] D. J. Reinkensmeyer, L. E. Kahn, M. Averbuch, A. McKenna-Cole, B. D. Schmit, W. Z. Rymer (2000) Understanding and treating arm movement impairment after chronic brain injury: progress with the ARM guide, Journal of Rehabilitation Research and Development 37:653-662.

[Sal93] Salisbury J K, Townsend W T (1993). *Compact Cable Transmission with Cable Differential*. U.S. Pat. No. 5,207,114. Washington, D.C.: U.S. Patent and Trademark Office.

[San03] Sanguineti, V., Morasso, P., Baratto, L., Brichetto, G., Mancardi, G. L., & Solaro, C. (2003). Cerebellar ataxia: Quantitative assessment and cybernetic interpretation. Human Movement Science, 22, 189-205.

[Sch00] T Schallert, J L Leasure, B Kolb (2000) Experience-associated structural events, subependymal cellular proliferative activity, and functional recovery after injury to the central nervous system," J Cerebr Blood F Met, 20(11):1513-1528.

[Kre06] H I Krebs, N Hogan (2006) Therapeautic Robotics: a technology push. Proceedings of the IEEE. 94(9):1727-1738

[Kre98] H. I. Krebs, N. Hogan, M. L. Aisen, B. T. Volpe (1998) Robot-aided neurorehabilitation, IEEE Transactions on Rehabilitation Engineering 6:75-87.

[Vol00] B. T. Volpe, H. I. Krebs, N. Hogan, L. Edelstein, C. Diels, M. Aisen (2000) A novel approach to stroke rehabilitation: robot-aided sensorimotor stimulation. Neurology 54:1938-1944.

The invention claimed is:

1. A rehabilitation human-machine interaction apparatus for upper body movement, the apparatus comprising:
   a H-shaped cable-driven mechanism comprising only one cable;
   two motors for driving the H-shaped cable-driven mechanism, a driving pulley coupled to each motor;
   a plurality of guides arranged along the x and y axes; and
   a manipulandum coupled to the H-shaped cable-driven mechanism for independent movement along x and y axes, wherein the manipulandum includes:
      a horizontal carriage;
      a solid base mounted to the horizontal carriage;
      a six degree of freedom force/torque sensor mounted to the solid base;
      a plurality of idler pulleys; and
      a plurality of vertical carriages;
   characterized in that
      four force channels are available, horizontal and vertical channels being passively obtained by providing mechanical stops on the vertical and horizontal carriages respectively to mechanically block the vertical and horizontal carriages respectively, and 45° channels being passively obtained by providing mechanical stops on one of the driving pulleys to block the driving pulley.

2. The apparatus of claim 1, wherein the H-shaped mechanism is configured in a form of a differential mechanism such that a user holding the manipulandum experiences low inertia.

3. The apparatus of claim 1, wherein the manipulandum further includes a handle.

4. The apparatus of claim 3, wherein the handle is a separate part of the manipulandum.

5. The apparatus of claim 1, wherein the cable is wound at least four turns around the driving pulley coupled to each motor.

6. The apparatus of claim 1, wherein the two motors are controlled by a motor driver.

7. The apparatus of claim 1, wherein a driving force of the two DC motors is determined by a position of the manipulandum.

8. The apparatus of claim 7, wherein the driving force of the two DC motors is determined using the following equations:

$$\begin{bmatrix} i_L \\ i_R \end{bmatrix} = K_i A^{-1}(\alpha B_c + \beta B_d)(A^{-1})^T \begin{bmatrix} \omega_L \\ \omega_R \end{bmatrix}$$

and $$\begin{bmatrix} V_L \\ V_R \end{bmatrix} = \begin{bmatrix} R_L & 0 \\ 0 & R_R \end{bmatrix} \begin{bmatrix} i_L \\ i_R \end{bmatrix} + \begin{bmatrix} K_{e,L} & 0 \\ 0 & K_{e,R} \end{bmatrix} \begin{bmatrix} \omega_L \\ \omega_R \end{bmatrix}.$$

9. The apparatus of claim 1, wherein the motor is of a type selected from a group consisting of: DC motor, AC motor, magnetic linear actuator, and pneumatic linear actuator.

* * * * *